(12) United States Patent
Piemonte et al.

(10) Patent No.: US 10,274,336 B2
(45) Date of Patent: Apr. 30, 2019

(54) CONTEXT AWARE MAP APPLICATION

(71) Applicant: Apple Inc., Cupertino, CA (US)

(72) Inventors: Patrick Piemonte, San Francisco, CA (US); Xiaoyuan Tu, Sunnyvale, CA (US); Christopher Moore, San Francisco, CA (US); Billy P. Chen, Santa Clara, CA (US); Christopher Blumenberg, San Francisco, CA (US); Seejo Pylappan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 948 days.

(21) Appl. No.: 13/627,871

(22) Filed: Sep. 26, 2012

(65) Prior Publication Data

US 2013/0332113 A1 Dec. 12, 2013

Related U.S. Application Data

(60) Provisional application No. 61/656,459, filed on Jun. 6, 2012.

(51) Int. Cl.
*H03F 1/26* (2006.01)
*G01C 21/36* (2006.01)
(Continued)

(52) U.S. Cl.
CPC .......... *G01C 21/367* (2013.01); *G01S 19/14* (2013.01); *G01S 19/39* (2013.01);
(Continued)

(58) Field of Classification Search
USPC .......................................... 702/189
See application file for complete search history.

(56) References Cited

U.S. PATENT DOCUMENTS 6,553,310 B1 * 4/2003 Lopke ................ G06F 17/3087
701/454
7,633,076 B2 12/2009 Huppi et al.
(Continued)

FOREIGN PATENT DOCUMENTS

CN 101404120 A 4/2009
CN 101438334 A 5/2009
(Continued)

OTHER PUBLICATIONS

PCT International Search Report and Written Opinion of the International Searching Authority for corresponding International Application No. PCT/US2013/038681, dated Aug. 2, 2013, 9 pages.
(Continued)

*Primary Examiner* — Aditya S Bhat
(74) *Attorney, Agent, or Firm* — Womble Bond Dickinson (US) LLP

(57) ABSTRACT

The embodiments described relate to techniques and systems for utilizing a portable electronic device to monitor, process, present and manage data captured by a series of sensors and location awareness technologies to provide a context aware map and navigation application. The context aware map application offers a user interface including visual and audio input and output, and provides several map modes that can change based upon context determined by data captured by a series of sensors and location awareness technologies.

27 Claims, 6 Drawing Sheets

(51) Int. Cl.
*H04M 1/725* (2006.01)
*G01S 19/14* (2010.01)
*G01S 19/39* (2010.01)
*G06F 11/30* (2006.01)

(52) U.S. Cl.
CPC ..... *H04M 1/72569* (2013.01); *G06F 11/3058* (2013.01); *G06F 11/3093* (2013.01); *H04M 1/72572* (2013.01); *H04M 2250/10* (2013.01); *H04M 2250/12* (2013.01)

(56) References Cited

U.S. PATENT DOCUMENTS

| | | | |
|---|---|---|---|
| 2007/0022380 | A1 | 1/2007 | Swartz et al. |
| 2011/0106418 | A1* | 5/2011 | van der Merwe ..... G01C 21/12 701/532 |
| 2011/0215903 | A1 | 9/2011 | Yang et al. |
| 2012/0115453 | A1* | 5/2012 | Zheng ............... H04M 1/72569 455/418 |
| 2013/0035893 | A1* | 2/2013 | Grokop ................... H04L 67/22 702/141 |

FOREIGN PATENT DOCUMENTS

| | | |
|---|---|---|
| CN | 101581585 A | 11/2009 |
| CN | 101915582 A | 12/2010 |
| CN | 102278995 A | 12/2011 |

OTHER PUBLICATIONS

Nivala, Annu-Maaria, et al., "Need for Context-Aware Topographic Maps in Mobile Devices," In: Proceedings of ScanGIS 2003, Espoo, FI (15 pages).

Schwartz, Tim, et al., "Seamless Resource-Adaptive Navigation," In: Crocker, M.W.; Siekmann,, J. (Eds): Resource-Adaptive Cognitive Processes, Heidelberg, Berlin, Springer-Verlag, 2010, pp. 239-265 (27 pages).

PCT International Preliminary Report on Patentability for PCT/US2013/038681, dated Dec. 18, 2014.

* cited by examiner

CONTEXT AWARE MAP APPLICATION

CROSS-REFERENCE TO RELATED APPLICATIONS

This application claims benefit of U.S. Provisional Application No. 61/656,459, filed Jun. 6, 2012, which is hereby incorporated by reference.

BACKGROUND OF THE DISCLOSURE

Mobile electronic devices have become increasingly complex as device functionality has grown. Devices such as smart-phones and tablet devices are commonly used for multiple, activities, including communication, web browsing, and navigation. In addition to cellular radio, and Wi-Fi connections, some mobile devices also contain a set of sensors that provide continuously updating information about the state of the device and the user of the device. Some devices include accelerometers which can provide data regarding the device's acceleration, and some devices include GPS receivers which can provide information as to the location of the mobile device. Some of the applications executing on a mobile device may find the information gathered by the radio and sensors useful for application purposes.

SUMMARY OF THE DESCRIPTION

The embodiments described relate to techniques and systems for utilizing a portable electronic device to monitor, process, present and manage data captured by a set of one or more sensors and location awareness technologies to provide context aware mapping and navigation. In one embodiment, the context aware map and navigation application can detect and learn the appropriate situations to transition navigation and mapping user interface into and out of different mapping and navigation modes. Historical information, as well as vector map data, such as road attributes (e.g. tunnels, roads, bridges, etc) contributes input to the system to improve predictions. In one embodiment, the context aware map application offers a user interface that can include visual and audio input and output.

In one embodiment, a mobile electronic device runs a context aware map application. The mobile device can also run additional applications beyond the context aware map application, such as providing media playback functionality and internet browsing capability. Embodiments of the mobile electronic device can take several forms including personal media player devices such as the iPod family of personal media players, in addition to smartphone devices such as the iPhone. The mobile electronic device can also take the form of a tablet computer such as the iPad, all of which are manufactured by Apple Inc. of Cupertino Calif.

In one embodiment, the output from the sensors can be analyzed to determine whether a context of the device has changed (such as, for example, the user has been walking with the device and the context has changed because the user is in a car moving at a faster speed), and this context change can be used to trigger launching of a navigation map for the device or switching from a walking mode to an automobile map mode, where the maps can differ and the information on the maps can also differ.

In one embodiment, a method performed by a processing system in a mobile electronic device for providing a context aware map application is described. In one embodiment, the mobile device includes at least a data storage device and a sensor arranged to detect an ambient activity, both the data storage device and the sensor being coupled to a processing system with one or more microprocessors. The method can be carried out by performing at least the following operations: detecting ambient activity from one or more sensors on an electronic device; determining a change in ambient activity based on one or more outputs; and launching or changing a mode of a mapping application executed on the electronic device in response to determining the change in ambient activity.

The various embodiments herein described can be implemented in numerous ways, including as a method, system, device, and computer readable medium. The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Although the processes are described below in terms of some sequential operations, it should be appreciated that some of the operations described may be performed in a different order. Moreover, some operations may be performed in parallel rather than sequentially.

Figure 1:
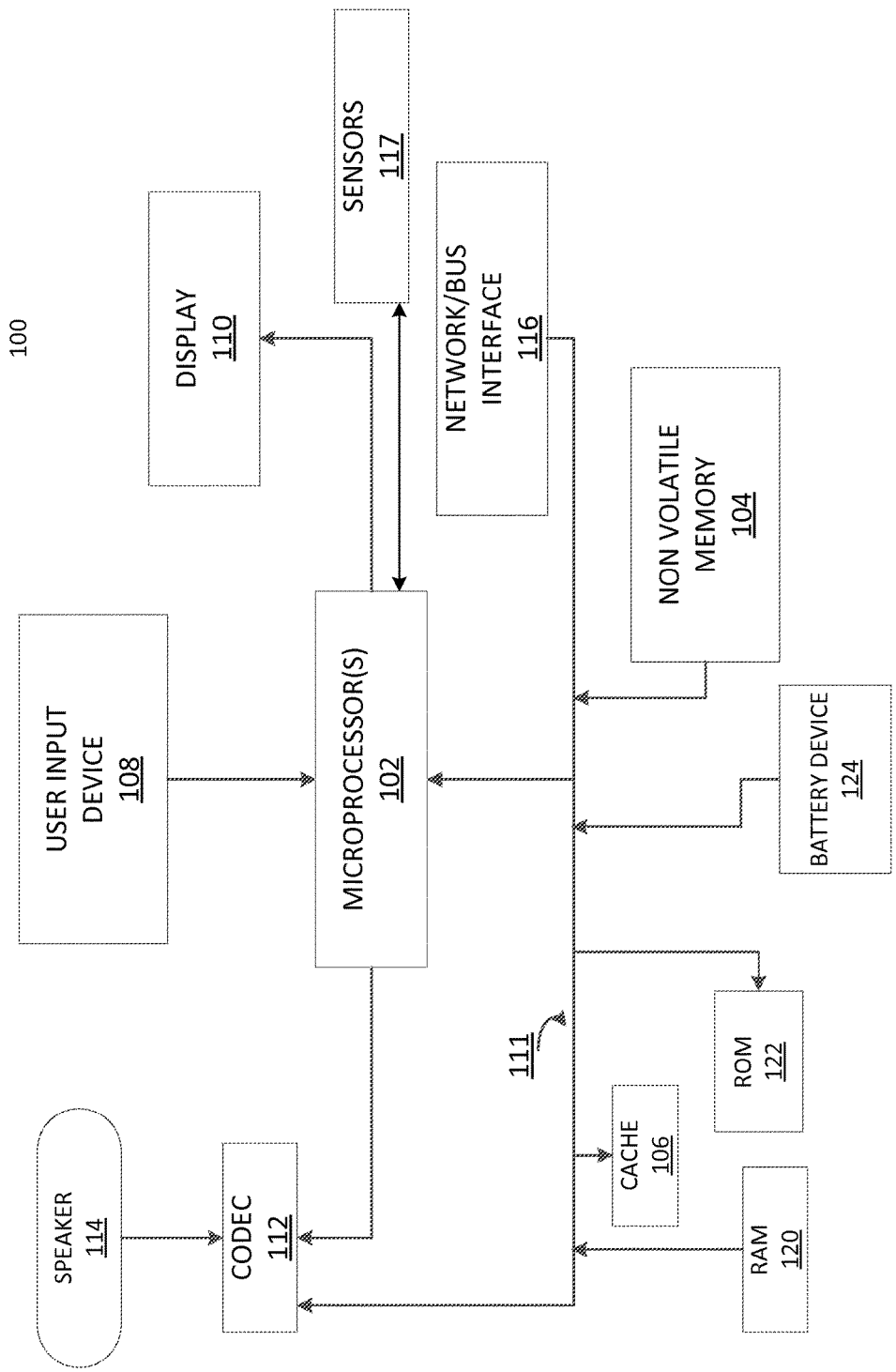
FIG. 1 is a block diagram of a mobile electronic device suitable for use with the described embodiments.

FIG. 1 is a block diagram of a mobile electronic device 100 suitable for use with the described embodiments. In one embodiment, the device 100 includes a processing system 102 with one or more microprocessors for controlling the overall operation of the device. Files, media, and other data can be stored in a file system located on a non-transitory, non-volatile memory storage device 104 and a data cache 106. The non-volatile memory 104 can be a flash based memory device or some other form of non-volatile memory. The data cache 106 can be a portion of Random Access Memory (RAM) 120 that can be used to provide improved access time to the non-volatile memory for frequently accessed data. In addition to use as a data cache, the RAM 120 can also provide a memory space to use for executing applications on the mobile electronic device 100. Additionally, a Read Only Memory (ROM) 122 can be used by the mobile device 100 for boot data, firmware, or other critical system data for the device.

The mobile device 100 can also include a user input device 108 such as a touch screen attached to a display device 110. The user input device 108 can allow the user to provide input to the device to control user directed activities. The device can also include other input devices (e.g. a microphone for voice command and control, etc). The display device 110 can contain a user interface, such as is provided by iOS devices such as the iPhone, iPad and iPod touch. A data bus 111 can facilitate data transfer between at least the non-volatile memory 104, the file system data cache 106, the processing system 102, and the CODEC 112. The CODEC 112 can produce analog output signals for a speaker 114, which can be a speaker internal to the electronic device 100 or external to the device via headphones, earphones or a Bluetooth audio connection. The network/bus interface 116 can allow a wired or wireless network connection via a number of devices, including a wireless transceiver. The mobile device 100 can also include one or more sensors 117 that can provide data used to sense the context or activity state of the device including, optionally, the state of the user of the device. These sensors can include one or more of: (a) Global Positioning System (GPS) receivers; (b) proximity sensors; (c) ambient light sensors; (d) accelerometers; (e) touch input panel; (f) orientation sensor; and (g) an electronic compass. The GPS receiver can determine position and velocity of the device, and an ambient light sensor can determine whether the device is being used in a dark place or outside in the sunlight. A proximity sensor can determine if the device is next to an object (e.g. next to a user's head). Further details about the sensors can be found in U.S. Pat. No. 7,633,076 which is incorporated herein by reference.

Figure 2:
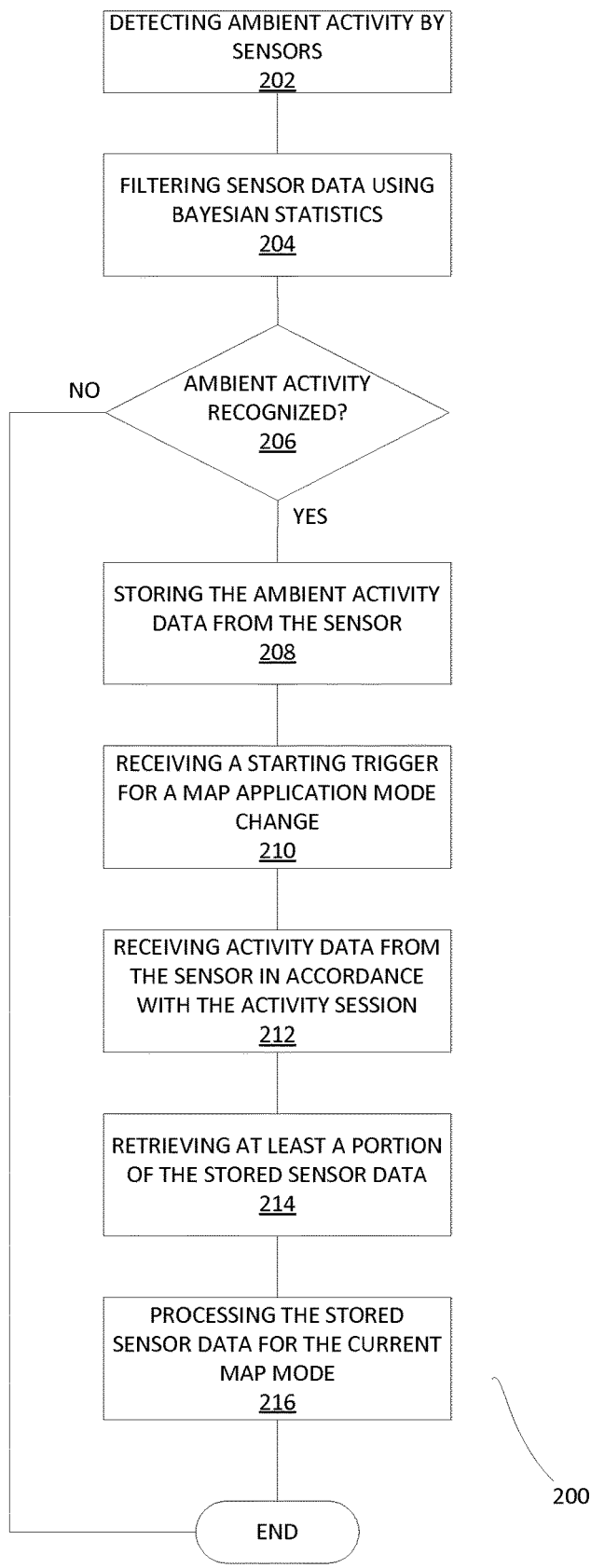
FIG. 2 is a flow diagram of one embodiment of a method of detecting and profiling context activity in an electronic device.

FIG. 2 is a flow diagram of one embodiment of a method of detecting and profiling context activity in an electronic device. The mode of operation of one or more of the map applications in the device can change based upon the detected context of the mobile device. According to one embodiment, process 200 initially detects ambient activity by the sensors at operation 202. For example, the sensors in the mobile electronic device can detect that the user is walking by correlating various motion and acceleration measurements based upon a model that has been calibrated and normalized for walking. Next, at operation 204, as the sensor continues to detect the ambient activity, the incoming sensor data is filtered via a Bayesian statistical model that enhances the accuracy of the sensor data, which, in one embodiment, allows the data generated by the sensors to be normalized across a range of devices, each with differing sensor performance and accuracy profiles. This allows a manufacturer to use different sensors in different models (or versions) of a product but provide a statistical model that works with at least a subset of these different sensors. In one embodiment, the sensor data can be filtered and processed by the processing system and stored in memory or written to a storage device.

The sensor data is filtered and processed because some activities are not easily distinguished from other activities that provide similar data from the sensors. For example, in one embodiment, sensor data may easily distinguish one activity profile from another, such as walking versus running, because of the larger distinction between the set of data gathered during each activity. However, cycling and driving on residential roads may present similar raw sensor data before analysis is done. The use of a statistical analysis method known as linear discriminant analysis (LDA) can improve the ability to distinguish between one activity and another activity.

Linear discriminant analysis can be performed on derived values associated with sample sensor data collected during a device's training phase. The linear discriminant analysis identifies particular derived features that can be used to distinguish different activities based on the difference between the values of derived features of one activity and the values of the derived features of a second activity. In one embodiment, linear discriminant analysis is used to derive values used to categorize sets of data and better distinguish from one activity profile over another. The derived values are calculated from raw accelerometer data and represent a characteristic of a motion pattern reflected in the accelerometer data (e.g., magnitude, tilt angle, energy associated with frequency, etc.). An abstract value is a value associated with an abstract feature, wherein the abstract feature is a linear combination of certain derived features that distinguish a particular activity from other activities as determined by linear discriminant analysis. Further information on the raw sensor data filter is provided in FIG. 5. In one embodiment, the filtering operation of 204 is optional and can be skipped.

At operation 206, the processing system can process the ambient activity data in order to determine whether or not the ambient activity is recognized. In one embodiment, the processing system can compare the received ambient activity data to a data pattern or profile of known user activity. In other words, the received ambient activity data is processed in such a way so as to form a data pattern or data profile corresponding to the ambient activity data that is then compared to the data pattern of the known recognized physical activity. If the processing system determines that there is no match, or at least that degree of matching is not sufficient to indicate a full match, then the process 200 ends. It should be noted, however, that in some embodiments, the unrecognized stimulus activity data is stored for potential subsequent processing. Even after the process 200 ends, it can begin again at some later point in time (e.g. 3 or 5 minutes from the time the process 200 ended), and the process 200 can repeat itself over time.

When at operation 206, the ambient data is recognized, and then the recognized ambient data is stored in a memory device at operation 208. It should be noted that operations 202-208 can operate in the background and require no user intervention. In this way, ambient activity data is being continuously received, evaluated, and stored if necessary. However, in order to not overload the memory resources, a particular implementation can require that only a specific amount of memory resources be used to store ambient activity data. For example, memory resources corresponding to 10 minutes worth of ambient data can be stored after which the previously stored data is over-written by more recent data. In this way, the user has access to the most recent, and what may be the most relevant ambient activity data. In another embodiment, the detecting and filtering and recognition and storing in operations 202, 204, 206 and 208 can occur only when the device is in a certain mode, such as a mode in which a map application is front most and is configured to receive user input, or a mode in which the map application has been launched and is executing, but is a background (e.g. not foreground) process. In one embodiment, the actions of operations 202, 204, 206 and 208 can be performed only when the map application has been launched and is executing, regardless of foreground or background state.

At operation 210, a mode switch is initiated when a mode switch trigger is received based on an apparent change in the activity session. In the described embodiment, the activity session can relate to a specific activity such as running, walking, or driving. In some cases the starting trigger can be a user initiated event received from the user by way of the mobile electronic device using, for example, a user interface. In other cases, however, the mode switch can be initiated automatically based upon the recognition of the ambient activity data, or a combination of the ambient activity and other external factors such as location, and temperature. The mobile electronic device can trigger a mode switch when there is a discrepancy between apparent activity session and device or map mode. For example, when the user starts to jog or run, the mobile electronic device can recognize the data characteristics associated with running (velocity change, stride length change, periodic up and down accelerations, and so on) to automatically retrieve a running session template that can include changing the manner in which the map data is rendered or displayed to the user to highlight activities that may be of use to the user when running. In this example, the map mode changes may involve switching from a walking map UI (User Interface) to a running map UI.

At operation 212, activity data in accordance with the recognized activity is received from the sensors, and at operation 214, at least some of the stored ambient activity data is retrieved. Next at operation 216, at least some of the stored ambient data and the activity data are processed in a manner in accordance with the activity session. For example, when the ambient data is associated with walking transitions into data associated with driving, the map application can mode switch into a driving navigation mode from a walking map mode. In driving mode, the information shown to the user is context sensitive based on the totality of incoming information as filtered by the Bayesian statistical models. For example, when in driving mode, a mobile device with a context aware mapping application can analyze light levels via a proximity sensor. Location services (GPS, Wi-Fi) can provide the current time and geographic location. Map data can describe the type of road structure, such as an interstate highway, bridge, tunnel, or other road structure. Weighting each of these inputs along with historical information of the navigation application's use, a subsystem can trigger user interface cross fade into a respective view mode (e.g. night mode, day mode, etc).

Figure 3:
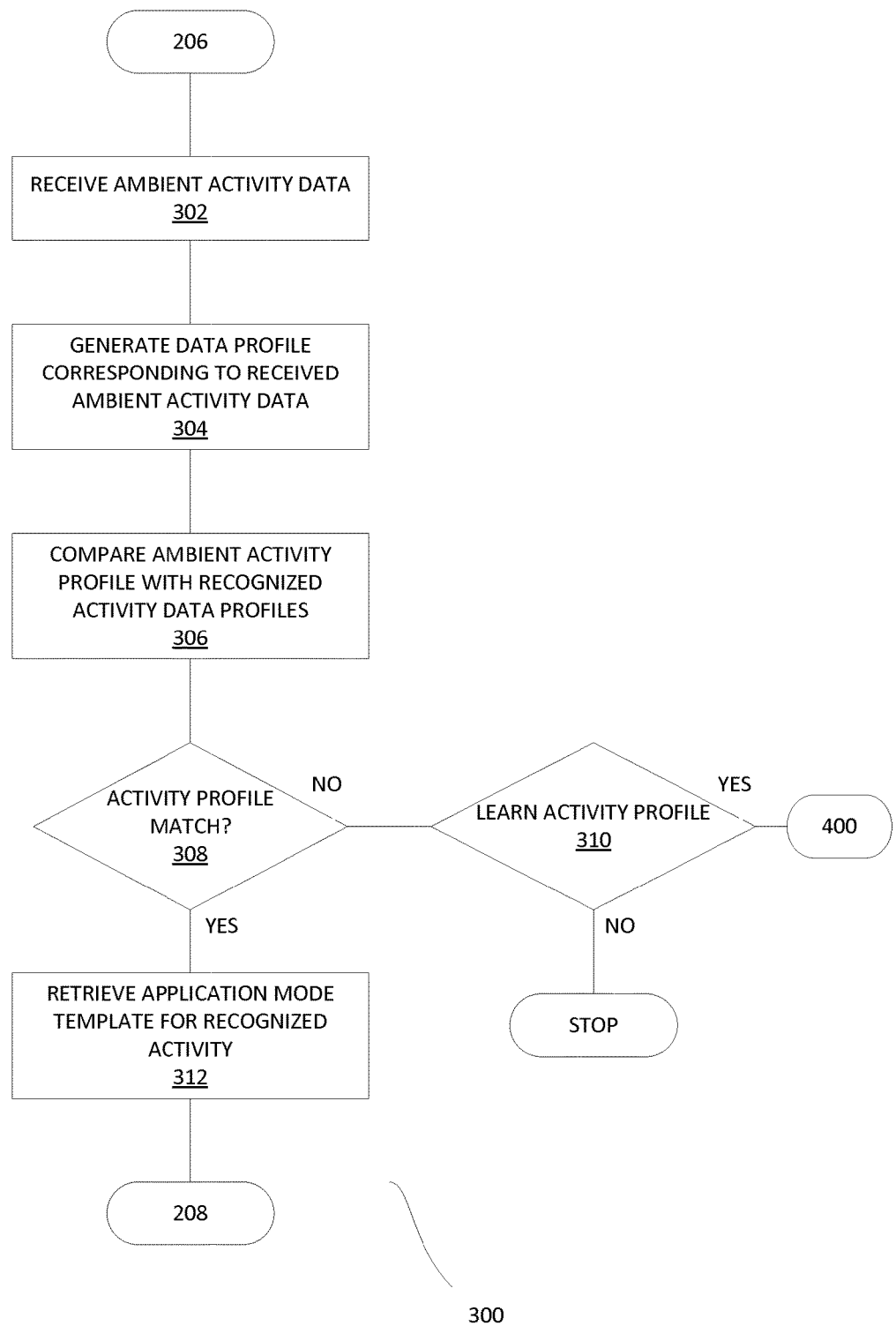
FIG. 3 is a flow diagram of an embodiment of a process that can be used to recognize ambient activity data.

FIG. 3 is a flow diagram of an embodiment of a process that can be used to recognize ambient activity data. In one embodiment, the process 300 can be performed by a mobile electronic device, such as the mobile electronic device of FIG. 1. Process 300 initially receives ambient activity data at operation 302. The ambient activity data can be received from the sensor directly or from a memory device in which at least some of the ambient activity data is stored. In some cases, this step can involve user interaction with the computing device to select or enter information that leads to determination if the process 300 is to proceed. This can be useful in those situations where power resources are limited, such as for a battery powered device having a limited remaining battery charge. This intervention may be particularly suitable for process 300, which typically runs in the background and may not be noticed by a user. Process 300 can then proceed to operation 304 where the processing system uses the received ambient activity data to generate a data profile. The data profile can be generated using a data profile generator that can be implemented as software instructions that are executed by the processing system. In one embodiment, the data profile generator can categorize the ambient activity data based upon particular activity signatures that can correspond to specific activities. The activity signature can then be used to compare with known, or recognized, activity data profiles in operation 306 where the ambient activity signature is compared to at least one recognized activity data profile. In this case, depending upon the degree of the match, process 300 can indicate that the ambient activity data corresponds to a known activity data profile.

For example, in one embodiment, when the ambient activity data includes motion data indicative of a speed and position that corresponds to walking, the data profile generator can identify the ambient activity data as walking. In some cases, the data profile generator can assign a probability to the data profile (or profiles). This can be particularly useful when the ambient activity data is somewhat ambiguous or does not readily fit pre-established activity models. With this data, a context aware map application can use sensor data, in combination with map data and location data via location awareness to determine the general pattern of user activity corresponding to an activity context. A user walking from a location identified as a place of work at a certain time of day can be presumed to be walking towards the user's automobile, or towards nearby mass transit, for a commute to the user's residence. This presumption can be confirmed if the sensor data and location awareness data indicate that the user is next travelling at driving speeds in the general direction of the user's residence. This data can then cross reference against known mass transportation routes and schedules to determine if the user is driving and automobile, or alternately is on a bus, train or some other form of mass transit. This information can trigger a mode switch in a context aware map application to display likely destinations, or other useful information, based upon available context. A voice prompt can also be used to request additional information from the user and confirm that the context based estimation of user activity is correct.

If at operation 308 there are no matching recognized activity data profiles, then process 300 proceeds to operation 310 where a learning option can be invoked. In some embodiments, whether or not the learning option is invoked can be pre-determined by the user by way of a user interface either during a setup operation or in real time. If it is determined that learning option is not available, or not selected, then process 300 stops and no further action is taken for processing any already received ambient activity data. On the other hand, if it is decided that the learning option is available and is to be used to learn the previously unrecognized ambient activity data, then process 300 proceeds to learning process 400 described below.

Turning back to operation 308, if at least one recognized activity data profile matches closely enough to be considered recognized, then at operation 312 a user activity template corresponding to the recognized activity is retrieved in preparation for any required map application mode change based upon the recognized activity. The activity templates can be used to define various map application modes. A template can, for example, be provided as a XML file, and can be included in firmware of the mobile electronic device, or downloaded to the mobile device during an application update.

Figure 4:
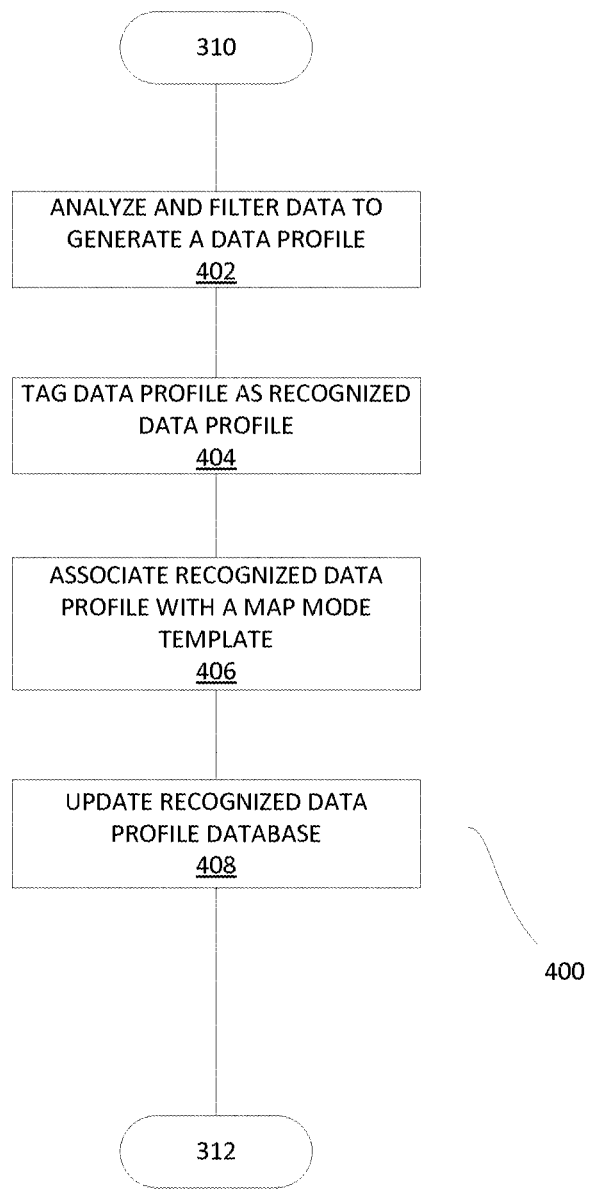
FIG. 4 is a flowchart detailing a representative learning process in accordance with the described embodiments.
Figure 5:
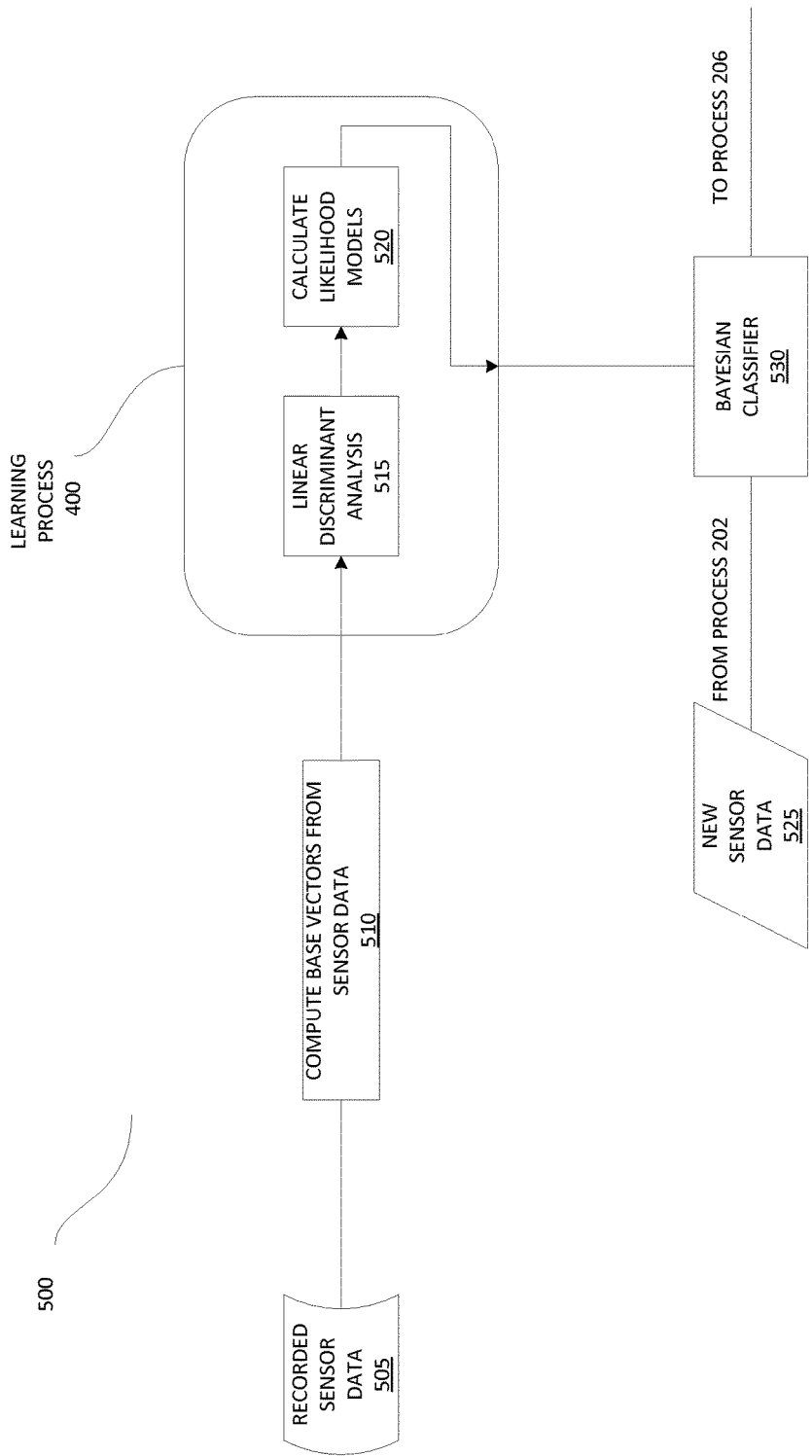
FIG. 5 is a flow diagram detailing a representative statistical filtering process during learning and classification accordance with the described embodiments.

FIG. 4 is a flowchart detailing a representative learning process 400 in accordance with the described embodiments. Process 400 can begin at operation 402 by analyzing and filtering data to generate an ambient activity profile. Statistical analysis and filtering can be performed on the relevant sensor data to improve the accuracy of the ambient data classification. The filtering process is illustrated in FIG. 5 and described in further detail below. The process can then proceed to operation 404 where the ambient activity profile is tagged as a recognize profile and to operation 406 can associate the now recognized ambient activity profile with an activity template. Once the sensor data has been analyzed, filtered, and classified, an ambient activity profile can be assigned to the data. The now recognized ambient activity profile can be paired with that activity template associated with a genre of map application modes corresponding to the recognized ambient activity profile.

For example, if the genre of the recognized ambient activity profile is walking on a walking trail, then any of a number of available walking map templates can be used to generate the walking mode map. Data gathered from location services can locate the device geographically, and map data associated with that geographic location can be read to gather information about the location near the device. In one embodiment, metadata associated with the map data can be read to provide information on the surrounding area. Alternatively, in one embodiment the map image data can be directly analyzed to gather information on the surrounding area. In any case, at operation 408, the recognized activity data profile database is updated to include the recognized ambient activity profile and the link to the associated activity template. In one embodiment, after the recognized activity profile database is updated, the processing system can proceed to operation 312 to retrieve an application mode template for the recognized activity.

FIG. 5 is a flow diagram describing the process 500 for filtering and classifying the sensor data to generate an ambient activity profile. In one embodiment, during a learning phase, recorded sensor data 505 from the activity to be learned can be used as input into a classification system. The sensor data can include accelerometer data collected from the accelerometer of a mobile device. In the case of a tri-axial accelerometer capable of gathering motion data in three dimensional space, the output of the accelerometer can be considered a vector comprised of x, y, and z components. Base feature vectors can be calculated at operation 510 to quantify and categorized the collected accelerometer data representing different characteristics of the motion patterns found within the data. In one embodiment, derived features may include, among other features, the magnitude of motion of a given vector, the number of times crossing a zero axis, tilt angle of the mobile device, and frequency data associated with any periodic motion within the data.

In one embodiment, during a learning phase, the device can attempt to determine a proper method of matching future sensor input with the sensor data that is currently being learned. Accordingly, linear discriminant analysis is performed at operation 515 to determine which of the derived features are representative of particular activity profiles and are, accordingly, appropriate to use when distinguishing between different activity profiles. In one embodiment, the features most suitable for distinguishing amongst activity profiles can be used to compute a likelihood model for that activity in operation 520. When an activity profile is known, the results of the linear discriminant analysis and the likelihood models can be, in one embodiment, used as inputs to a Bayesian classifier 530, which can determine the probability that the given sensor input can be associated with a given activity profile.

In one embodiment, the filtering methods used to improve data classification are also used to normalize slight differences in sensor performance across devices, or across device classes. For example, the type of raw sensor data gathered by, a Smartphone device will differ slightly for data gather for a tablet device. Additionally, there may be some variance between individual devices, or between device generations, due to changes in manufacture, design, or calibration of the various sensors. In one embodiment, the statistical model of each device is trained during device setup using the sensors of the device. During device training, minor variances between the device sensors and reference sensor data can be normalized by the statistical model for devices of the same product class. Variances between product classes that may be large enough to impact the performance of the device's context selection can be addressed by adjusting the model used for that product class.

Figure 6:
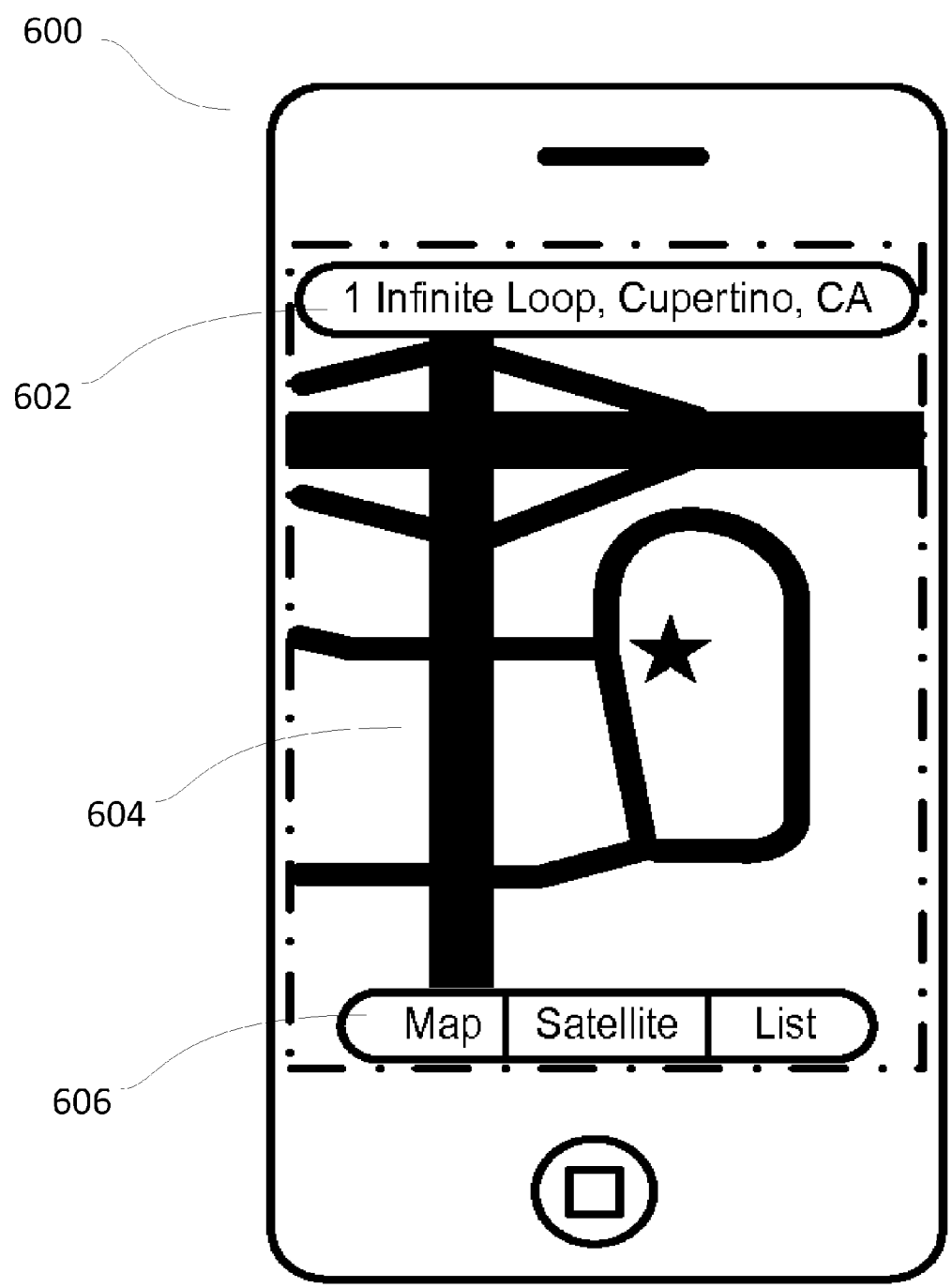
FIG. 6 is a block diagram of an embodiment of a mobile electronic device running an example of a context aware map application.

FIG. 6 is a block diagram of an example mobile electronic device 600 displaying an example context aware map application. In various embodiments, the mobile device can be a portable media player, a smart phone, or a tablet device. The mobile electronic device 600 can include a display and touch screen similar to, for example, the display device 110 and user input device 108 of FIG. 1 to display a graphical user interface and allow user input. In one embodiment, an example map application 604 can display data such as informational display 602 which can show information such as current device location or current navigation destination. In one embodiment, a map mode selector 606 can be use to transition into different map modes, or a map mode can be selected automatically based on context information determined by activity profile.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. The various aspects, embodiments, implementations, or features of the embodiment can be used separately or in any combination.

The described embodiments can also be embodied as computer readable code on a non-transitory computer readable medium. A non-transitory computer readable medium is any data storage device that can store data which can thereafter be read by a computer system, other than medium designed specifically for propagating transitory signals. Examples of non-transitory computer readable media include floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions. In various embodiments, software-instructions stored on a machine-readable storage medium can be used in combination with hardwired circuitry to implement the present invention. Thus, the techniques are not limited to any specific combination of hardware circuitry and software instructions, or to any particular source for the instructions executed by the data processing system associated with an apparatus for performing one or more of the operations described herein.

The many features and advantages of the described embodiments are apparent from the written description and, thus, it is intended by the appended claims to cover all such features and advantages of the embodiment. Further, since numerous modifications and changes will readily occur to those skilled in the art, the described embodiments should not be limited to the exact construction and operation as illustrated and described. Hence, all suitable modifications and equivalents may be resorted to as falling within the scope of the embodiment.

What is claimed is:

1. A method comprising:
    detecting ambient activity from one or more outputs from a set of sensors on an electronic device;
    filtering the ambient activity using a statistical model via a set of ambient activity profiles created from sample sensor data, the set of ambient activity profiles including at least a first activity profile and a second activity profile;
    determining a change in ambient activity from the first activity profile to the second activity profile based on the filtering;
    changing a mode of a mapping application executing on the electronic device in response to determining the change in ambient activity from the first activity profile to the second activity profile, wherein changing the mode of the mapping application includes transitioning a user interface (UI) of the mapping application operating in a first map mode associated with the first activity profile to operating in a second map mode associated with the second activity profile; and
    switching from rendering map data for the mapping application according to the UI operating in the first map mode to rendering map data for the mapping application according to the UI operating in the second map mode.

2. The method as in claim 1, the statistical model is a Bayesian statistical model and the ambient activity includes output from multiple sensors selected from a set of sensors comprising a Global Positioning System (GPS) receiver, a proximity sensor, an ambient light sensor, an accelerometer, a touch input panel, an orientation sensor, or an electronic compass.

3. The method as in claim 1, wherein ambient activity profiles are created from sample sensor data during a training phase via linear discriminant analysis and wherein creating the ambient activity profiles comprises:
    receiving ambient activity data from the set of sensors on the electronic device;
    generating a data profile corresponding to received ambient activity data using linear discriminant analysis;
    comparing the data profile with recognized ambient activity using a Bayesian classifier;
    normalizing sensor output across device classes via the linear discriminant analysis and Bayesian classifier; and
    adding received ambient activity to a set of recognized ambient activity profiles.

4. The method as in claim 1, wherein changing the mode of a mapping application executing on the electronic device additionally comprises:
    storing sensor data while in the first map mode of the mapping application;
    receiving a mode switch trigger based on the change in ambient activity;
    changing the mode of the mapping application to a second mode;
    receiving activity data from the set of sensors in accordance with a current activity session;
    retrieving at least a portion of the sensor data stored while in the first map mode of the mapping application; and
    processing the stored sensor data for the second mode of the mapping application.

5. The method as in claim 4, wherein the mapping application has map modes comprising a walking mode, a running or a driving mode.

6. The method as in claim 5, further comprising a mass transit mode or a cycling mode.

7. The method as in claim 5 or 6, wherein each mode has alternate mode variants comprising a day mode variant, and a night mode variant.

8. The method as in claim 7, wherein each alternate mode variant is determined by parameters comprising light level, current time, geographic location, and map data.

9. A machine implemented method at an electronic device, the method comprising:
    receiving ambient activity data from one or more outputs from a set of sensors on the electronic device;
    generating a data profile corresponding to received ambient activity data using linear discriminant analysis; and
    comparing the data profile with recognized ambient activity using a Bayesian classifier;
    normalizing sensor output across device classes via the linear discriminant analysis and Bayesian classifier;
    adding received ambient activity data to a set of recognized ambient activity profiles including at least a first activity profile and a second activity profile;
    determining if the received ambient activity data indicates a change from the first activity profile to the second activity profile;
    changing a mode of a mapping application executing on the electronic device in response to determining the change from the first activity profile to the second activity profile, wherein changing the mode of the mapping application includes transitioning a user interface (UI) operating of the mapping application operating in a first mode associated with the first activity profile to operating in a second mode associated with the second activity profile; and
    switching from rendering map data for the mapping application according to the UI operating in the first mode to rendering map data for the mapping application according to the UI operating in the second mode.

10. The machine implemented method as in claim 9, wherein the data profile for the received ambient activity data matches a data profile in a set of recognized ambient activity profiles including the first activity profile and second activity profile.

11. The machine implemented method as in claim 10, wherein the data profile for the received ambient activity data is added to the set of recognized ambient activity profiles.

12. A non-transitory machine-readable storage medium having instructions stored therein, which when executed by a machine cause the machine to perform operations, the operations comprising:
- detecting ambient activity from one or more outputs from a set of sensors on an electronic device;
- filtering the ambient activity using a statistical model via a set of ambient activity profiles created from sample sensor data, the set of ambient activity profiles including at least a first activity profile and a second activity profile;
- determining a change in ambient activity from the first activity profile to the second activity profile based on the filtering;
- changing a mode of a mapping application executing on the electronic device in response to determining the change in ambient activity from the first activity profile to the second activity profile,
- wherein changing the mode of the mapping application includes transitioning the mapping application from operating with a first user interface (UI) template associated with the first activity profile to operating with a second UI template associated with the second activity profile; and
- switching from rendering map data via the mapping application according to the first UI template to rendering map data via the mapping application according to the second UI template in response to changing the mode of the mapping application.

13. The machine-readable storage medium of claim 12, wherein the statistical model is a Bayesian statistical model and the ambient activity includes output from multiple sensors selected from a set of sensors comprising a Global Positioning System (GPS) receiver, a proximity sensor, an ambient light sensor, an accelerometer, a touch input panel, an orientation sensor, or an electronic compass.

14. The machine-readable storage medium of claim 13, wherein the Bayesian statistical model filters detected ambient activity using ambient activity profiles created from sample sensor data during a training phase via linear discriminant analysis and wherein creating the ambient activity profiles comprises:
- receiving ambient activity data from the set of sensors on the electronic device;
- generating a data profile corresponding to received ambient activity data using linear discriminant analysis;
- comparing the data profile with recognized ambient activity using a Bayesian classifier;
- normalizing sensor output across device classes via the linear discriminant analysis and Bayesian classifier; and
- adding received ambient activity to a set of recognized ambient activity profiles including the first activity profile and second activity profile.

15. The machine-readable storage medium of claim 12, wherein launching or changing a mode of a mapping application executing on the electronic device comprises:
- storing sensor data while in a first mode of the mapping application;
- receiving a mode switch trigger based on the change in ambient activity;
- changing the mode of the mapping application to a second mode;
- receiving activity data from the set of sensors in accordance with a current activity session;
- retrieving at least a portion of the sensor data stored while in the first mode of the mapping application; and
- processing the stored sensor data for the second mode of the mapping application.

16. The machine-readable storage medium of claim 15, wherein the mapping application has map modes comprising a walking mode, a running mode or a driving mode, each mode with an alternate variant comprising at least a day mode and a night mode.

17. The machine-readable storage medium of claim 16, further comprising a mass transit mode or a cycling mode.

18. The machine-readable storage medium of claim 17, wherein the alternate mode variant of each mode is determined by parameters comprising light level, current time, geographic location, and map data.

19. An electronic device comprising:
- one or more sensors, to sense ambient activity for the electronic device;
- a data storage device, to store sensor data received from the one or more sensors; and
- processing logic to execute a context aware map application, the context aware map application to cause the processing logic to:
- detect ambient activity via sensor data from the one or more sensors while in a first map mode;
- filter the sensor data using a statistical classifier to determine an activity profile associated with the ambient activity;
- store sensor data associated with the ambient activity including a first activity profile and a second activity profile;
- receive a trigger indicating a mode change for the context aware map application from a first map mode associated with the first activity profile to a second map mode associated with the second activity profile;
- transition a user interface (UI) of the context aware map application from the first map mode to the second map mode in response to the ambient activity changing from the first activity profile to the second activity profile;
- receive activity data from the one or more sensors in accordance with an activity session associated with the second map mode;
- retrieve at least a portion of the stored sensor data;
- process the stored sensor data for the second map mode of the context aware mapping application; and
- switch from render map data for the context aware mapping application according to the first map mode to render map data for the mapping application according to the UI operating in the second map mode.

20. The electronic device as in claim 19, wherein the statistical classifier is a Bayesian statistical classifier.

21. The electronic device as in claim 19, wherein the first or second map mode is a walking mode, a running mode, or a driving mode.

22. The electronic device as in claim 19, wherein the first or second map mode is a mass transit mode or a cycling mode.

23. The electronic device as in claim 19, wherein each mode has alternate variants comprising a day mode variant, and a night mode variant and one or more of the alternate variants for the mode is determined by parameters comprising light level, current time, geographic location, and map data.

24. The electronic device as in claim 19, wherein the processing logic, in response to the trigger indicating the mode change for the context aware map application, is further to:
- recognize sensor data characteristics associated with an activity; and retrieve a template associated with the activity, the template to change a manner in which map data is displayed via the context aware map application.

25. The electronic device as in claim 24, the processing logic additionally configured to learn additional activity profiles associated with the ambient activity, wherein to learn the additional activity profiles, the processing logic is further to:
analyze and filter data to generate a data profile;
tag the data profile as a recognized data profile;
associate the recognized data profile with a map template;
update a recognized data profile database to include the recognized data profile and a link to the map template.

26. A non-transitory machine-readable storage medium having instructions stored therein, which when executed by a machine cause the machine to perform operations, the operations comprising:
detecting ambient activity from output of multiple sensors in a set of sensors on an electronic device;
filtering the ambient activity using a statistical model via a set of ambient activity profiles created from sample sensor data, the set of ambient activity profiles including at least a first activity profile and a second activity profile;
determining a change in ambient activity from the first activity profile to the second activity profile based on the filtering; and
changing a mode of a mapping application executing on the electronic device in response to determining the change in ambient activity from the first activity profile to the second activity profile, wherein changing the mode of the mapping application includes transitioning the mapping application from operating with a first user interface (UI) template associated with the first activity profile to operating with a second UI template associated with the second activity profile; and
switching from rendering map data via the mapping application according to the first UI template to rendering map data via the mapping application according to the second UI template after changing the mode of the mapping application.

27. The non-transitory machine-readable storage medium as in claim 26, wherein the statistical model is a Bayesian statistical model and the multiple sensors in the set of sensors include at least a Global Positioning System (GPS) receiver, an ambient light sensor and an accelerometer.

* * * * *